(12) United States Patent
Bernitsas et al.

(10) Patent No.: US 11,143,158 B2
(45) Date of Patent: Oct. 12, 2021

(54) CONTACT-LESS MAGNETIC SUPPORTS FOR MARINE HYDROKINETIC ENERGY HARVESTING USING FLOW INDUCED OSCILLATIONS

(71) Applicant: THE REGENTS OF THE UNIVERSITY OF MICHIGAN, Ann Arbor, MI (US)

(72) Inventors: Michael M. Bernitsas, Saline, MI (US); Nikolas Xiros, New Orleans, LA (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 0 days.

(21) Appl. No.: 16/907,895

(22) Filed: Jun. 22, 2020

(65) Prior Publication Data

US 2020/0408186 A1    Dec. 31, 2020

Related U.S. Application Data

(60) Provisional application No. 62/866,898, filed on Jun. 26, 2019.

(51) Int. Cl.
*F03B 13/12* (2006.01)

(52) U.S. Cl.
CPC ........ *F03B 13/12* (2013.01); *F05D 2240/511* (2013.01)

(58) Field of Classification Search
CPC ........... F03B 13/12; F03B 13/14; F03B 13/26
See application file for complete search history.

(56) References Cited

U.S. PATENT DOCUMENTS

| 7,493,759 | B2 | 2/2009 | Bernitsas et al. |
| 8,047,232 | B2 | 11/2011 | Bernitsas et al. |
| 2013/0277982 | A1* | 10/2013 | Choi ........................ F03D 15/10 290/55 |
| 2016/0111936 | A1* | 4/2016 | Halstead ................. F03D 15/00 290/43 |

* cited by examiner

*Primary Examiner* — Viet P Nguyen
(74) *Attorney, Agent, or Firm* — Harness, Dickey & Pierce, P.L.C.

(57) ABSTRACT

A contactless magnetic support for a marine hydrokinetic energy harvesting system. The marine hydrokinetic energy harvesting system employing flow induced oscillations. The contactless magnetic support comprising a first ferromagnetic core; and a second ferromagnetic element being magnetically positioned relative to the first ferromagnetic core, the second ferromagnetic element being smaller compared to the first ferromagnetic core thereby inducing a non-homogenous magnetic field caused by dimensional disparity.

3 Claims, 1 Drawing Sheet

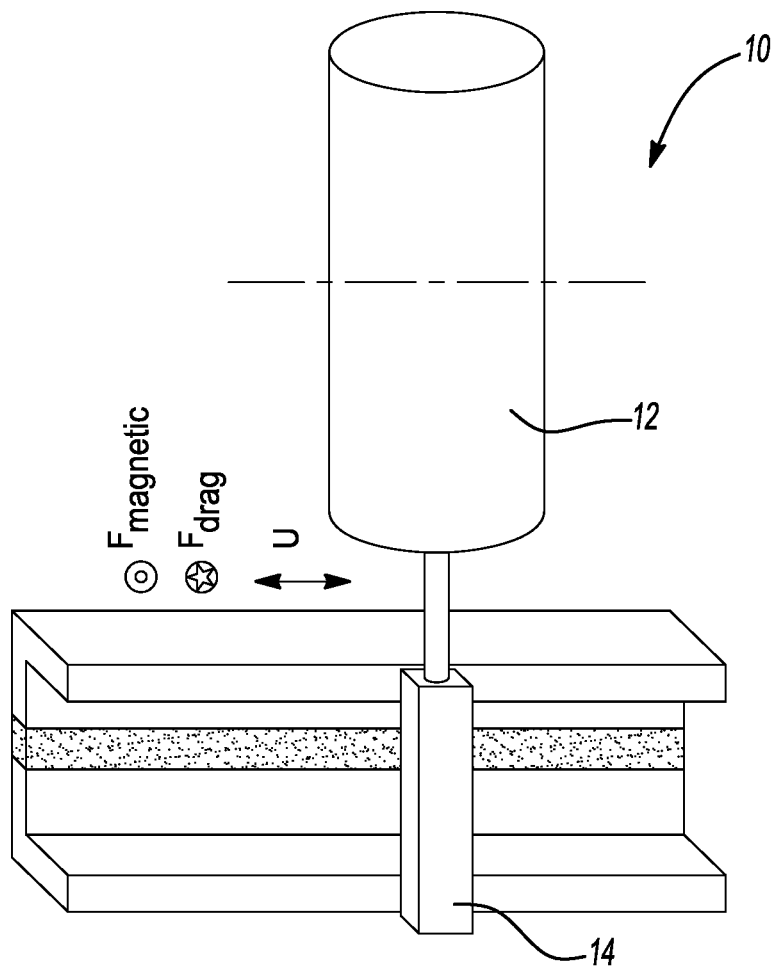

CONTACT-LESS MAGNETIC SUPPORTS FOR MARINE HYDROKINETIC ENERGY HARVESTING USING FLOW INDUCED OSCILLATIONS

CROSS-REFERENCE TO RELATED APPLICATIONS

This application claims the benefit of U.S. Provisional Application No. 62/866,898, filed on Jun. 26, 2019. The entire disclosure of the above application is incorporated herein by reference.

FIELD

The present disclosure relates to energy harvesting and, more particularly, relates to marine hydrokinetic energy harvesting using flow induced oscillations and contact-less magnetic supports.

BACKGROUND AND SUMMARY

This section provides background information related to the present disclosure which is not necessarily prior art. This section provides a general summary of the disclosure, and is not a comprehensive disclosure of its full scope or all of its features.

With reference to commonly invented U.S. Pat. Nos. 7,493,759 and 8,047,232, which are incorporated herein by reference, the Vortex Induced Vibration for Aquatic Clean Energy (VIVACE) Converter of these patents harnesses Marine Hydrokinetic (MHK) energy using Flow Induced Oscillations (FIO). Specifically, this technology employs Vortex Induced Vibrations (VIV), galloping, and their coexistence, which are catastrophic phenomena, to harvest energy. Typically, these phenomena are suppressed in numerous engineering applications. However, VIVACE enhances them and controls them to generate MHK energy. Both underlying phenomena induce alternating lift (like fish), not steady lift (like blades of propellers).

VIVACE resolves several challenges that MHK energy harnessing faces today by (a) harnessing energy even from flows slower than 3 knots, which represent the vast majority of currents around the world and are below the lower limit of turbines (4 knots), (b) being environmentally compatible as it mimics kinematics of fish individually or in schools, and (c) having high power-to-volume ratio for a renewable energy technology.

However, one of the challenges VIVACE faces is the low lift-to-drag ratio compared to turbines. That is, alternating lift starts at low speeds and generates energy in an environmentally compatible way, but pays penalty in that it results in high drag. This high drag leads to high friction in the bearings and reduction and loss of efficiency.

In accordance with the principles of the present teachings, the present disclosure overcomes the disadvantage of existing technology by employing magnetic levitation (MagLev) bearings disposed in water to minimize friction of the VIVACE oscillators, thereby reducing drag and improving efficiency and viability. The present technology has many applications, particularly in the water environment, as will be discussed herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic view illustrating a first ferromagnetic core and a smaller second ferromagnetic core according to the present teachings.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the FIGURES. Spatially relative terms may be intended to encompass different orientations of the device in use or operation in addition to the orientation depicted in the FIGURES. For example, if the device in the FIGURES is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Generally speaking, Marine Hydrokinetic (MHK) energy comes in two major forms—horizontal in currents/tides/rivers and vertical in waves. Horizontal energy is typically in the form of currents, tides, and rivers. Vertical energy is typically in the form of waves. Although there are five categories of concepts used to harness vertical wave MHK energy, there are generally only two categories of concepts to harness horizontal wave MHK energy:

(a) Steady Lift Technologies (SLT) using steady lift on blades, such as turbines.

(b) Alternating Lift Technologies (ALT) using alternating lift on bluff bodies, similar to fish individually or in schools. This develops due to either (i) alternating large (von Karman) vortices in the wake of a bluff body in Vortex induced Vibrations (VIV); or (ii) shear layer instability in galloping. The aforementioned U.S. Pat. Nos. 7,493,759 and 8,047,232 primarily are focused on harvesting horizontal MHK energy (although it can be used in vertical wave MHK energy as well). Hereafter, the present disclosure will be focused on horizontal MHK energy technologies.

Of these technological, various gaps exist that inhibit broad use thereof:

Technology Gap #1: The vast majority of ocean currents are slower than 3 knots and typical rivers are slower than 2 knots. Turbines and open-water propellers require a minimum of 4 knots for operation and 5 knots for financial viability. VIVACE can function in 2 knots and in various models can begin generating energy at 0.6 knots.

Technology Gap #2: This lies in the environmental compatibility of an MHK technology. There is strong opposition to deployment of experimental turbines and open propellers due to anticipated interference with swimmers, divers, boaters, and marine life. VIVACE uses alternating lift, like fish do, and is thus environmentally compatible. Notably, fish actually thrive in the wake of the cylinders and bluff bodies of VIVACE.

Technology Gap #3: The power density of turbine-based technologies is very low. Specifically, large spacing is needed between turbines in the direction of the flow to minimize interference. This may be considered the Achilles heel of all renewables. For example, onshore wind-farms have power density of 0.01 W/m3 (at 12 m/s), where volume is measured to the tip of the top blade. VIVACE has achieved power density of 640 W/m3 at equivalent flow velocity (1.3 m/s). Both though are far from the diesel engine density of 25,000 W/m3.

Technology Gap #4: The marine environment is relentless in terms of high forces, random excitation, corrosion, foundation, seals, bearings, deployment, and more. These result in high costs in maintenance and replacement. The cost of MHK energy as measured by levelized cost of electricity (LCOE) is presently high. Specifically, in a recent solicitation for new MHK concepts in 2016, the Energy Efficiency and Renewable Energy (EERE) office of Department of Energy (DOE) has set a target for MHK energy of 15 ¢/kWh by the year 2030. This is not competitive even with today's standards.

Presently, VIVACE has reached a viable stage of development and can be built for deployment. It is, however, a new technology in continual development. Generally, the VIVACE technology can be improved in the following areas:

(i) Hydrodynamic design: This presently focuses on synergistic Flow Induced Oscillations (FIO), where bodies in close proximity can extract more energy than by being in hydrodynamic isolation.

(ii) Mechanical oscillator: It has been found that by employing nonlinear oscillators, performance can be significantly improved. Moreover, by introducing adaptive damping, further improvements are realized. One of the challenges VIVACE faces is the low lift-to-drag ratio compared to turbines. That is, alternating lift starts at low speeds and generates energy in an environmental compatible way, but pays penalty in high drag. Therefore, in accordance with the present teachings, Magnetic Levitation (MagLev) bearings are provided to minimize friction of oscillating cylinders due to high drag.

(iii) Nonlinear controls: The two underlying phenomena used in VIVACE hydrodynamics, Vortex Induced Vibrations (VIV) and galloping, do not have mathematical models. Extensive hydrodynamic data are collected systematically and numerical procedures are used to develop models needed for controls.

(iv) Deployment technology: This involves designing a self-deployment system to reduce cost.

(v) Manufacturing: This involves design for mass production to minimize cost.

Magnetic Levitation (MagLev) Bearings

As described herein, one of the challenges VIVACE faces is the low lift-to-drag ratio of bluff oscillating bodies compared to turbines. That is, alternating lift starts at low speeds and generates energy in an environmental compatible way but pays penalty in the form of high drag. The latter results in high friction between bearings and supports in the oscillators. Designing minimum friction bearings in the marine environment results in a major boost of VIVACE's performance.

In accordance with the present teachings, a solution is provided that minimizes or even eliminates the substantial friction developed due to drag that presses the oscillating cylinder against the guiding shaft of the bearings. In existing configurations of the VIVACE Converter, there is physical mechanical contact that causes friction energy loss. However, magnetic bearings are used to eliminate contact in the water environment in the VIVACE oscillators. The absence of contact minimizes friction and improves the system in several aspects.

Generally, MagLev systems exhibit higher efficiency and reduced maintenance while providing longer lifetime and higher durability when appropriate engineering design and control are applied.

In order to minimize friction effects, on the cylinder in FIO (vortex induced vibrations and galloping), as a result of hydrodynamic drag, the MagLev system 10 in FIG. 1 is provided to counteract hydrodynamic drag. This configuration, exhibits variable nonhomogeneous magnetic fields. In this regard, a first ferromagnetic core 12, of known dimensions, is considered under the effects of an externally imposed magnetic field. A second ferromagnetic element 14, of smaller dimensions, is then placed adjacent to first ferromagnetic core 12. This particular configuration results in a non-homogenous magnetic field for first ferromagnetic core 12, caused by dimensional disparity. In other words, the magnetic flux does not follow a linear path from the first ferromagnetic core 12 to second ferromagnetic element 14. In this regard, a general electromagnetic analysis is conducted to derive an analytical form for the magnetic field of first ferromagnetic core 12. Numerical simulation is subsequently carried out to validate the previously obtained formula. This distinct expression for the magnetic field is valuable towards calculating the magnetic energy of such particular configuration, which is essential to the design of the FIO energy harvesting magnetic support system disclosed herein.

It should be understood that growing a vibrant clean energy industry will lead to immense social benefits, including reduction of pollution and creation of a large number of jobs. It has been estimated that 19 GW of electrical power generation is technically recoverable from ocean currents in U.S. waters. This resource is equivalent to 4.1% of the 466 GW total average U.S. power production during 2015. Hydrokinetic power production from U.S. rivers/tides will benefit from the proposed research, with extractable power of 14 GW/50 GW, respectively. These resources provide a U.S. in-stream hydrokinetic power potential of 83 GW, which is equivalent to 18% of 2015 average total U.S. power production. This resource is in 200-500 m depth from S. Florida to N. Carolina. Energy density of 3.3 kW/m2 exists off S. Florida, 30 m below sea surface. This is 6.6 times the density required by NREL to characterize a wind energy site as "excellent".

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A contactless magnetic support for a marine hydrokinetic energy harvesting system, the marine hydrokinetic energy harvesting system employing flow induced oscillations, the contactless magnetic support comprising:
   a first ferromagnetic core; and
   a second ferromagnetic element being magnetically positioned relative to the first ferromagnetic core to permit oscillating motion relative thereto, the second ferromagnetic element being smaller in size compared to the first ferromagnetic core thereby inducing a non-homogenous magnetic field caused by dimensional disparity,
   wherein the first ferromagnetic core is configured to be coupled to a first portion of the marine hydrokinetic energy harvesting system and the second ferromagnetic element is configured to be coupled to a second portion of the marine hydrokinetic energy harvesting system, the first ferromagnetic core being movable relative to the second ferromagnetic element to support hydrodynamic forces produced in response to the flow induced oscillations of the first portion relative to the second portion of the marine hydrokinetic energy harvesting system, the first ferromagnetic core and the second ferromagnetic element are configured to be disposed in water,
   wherein the first portion is one of an oscillating cylinder and a guiding shaft of the marine hydrokinetic energy harvesting system and the second portion is the other of the oscillating cylinder and a guiding shaft of the marine hydrokinetic energy harvesting system.

2. A contactless magnetic support for a marine hydrokinetic energy harvesting system, the marine hydrokinetic energy harvesting system employing flow induced oscillations, the contactless magnetic support comprising:
   a first ferromagnetic core coupled to a first portion of the marine hydrokinetic energy harvesting system; and
   a second ferromagnetic element coupled to a second portion of the marine hydrokinetic energy harvesting system, the second ferromagnetic element being magnetically positioned relative to the first ferromagnetic core and movable relative to the first ferromagnetic core to support hydrodynamic forces produced in response to the flow induced oscillations of the marine hydrokinetic energy harvesting system, the second ferromagnetic element being smaller in size compared to the first ferromagnetic core thereby inducing a non-homogenous magnetic field caused by dimensional disparity, the first ferromagnetic core and the second ferromagnetic core being configured to be disposed in a marine environment,
   wherein the first portion is one of an oscillating cylinder and a guiding shaft of the marine hydrokinetic energy harvesting system and the second portion is the other of the oscillating cylinder and a guiding shaft of the marine hydrokinetic energy harvesting system.

3. The contactless magnetic support according to claim 2 wherein the first ferromagnetic core is movable in an oscillating manner relative to the second ferromagnetic element.

* * * * *